US012539909B2

(12) United States Patent
Huber (10) Patent No.: US 12,539,909 B2
(45) Date of Patent: Feb. 3, 2026

(54) ADJUSTMENT DRIVE FOR A STEERING COLUMN OF A MOTOR VEHICLE, AND STEERING COLUMN FOR A MOTOR VEHICLE

(71) Applicants: thyssenkrupp Presta AG, Eschen (LI); thyssenkrupp AG, Essen (DE)

(72) Inventor: Sebastian Huber, Goefis (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 19/066,410

(22) Filed: Feb. 28, 2025

(65) Prior Publication Data

US 2025/0282410 A1      Sep. 11, 2025

(30) Foreign Application Priority Data

Mar. 5, 2024   (DE) ............... 10 2024 106 302.5

(51) Int. Cl.
*B62D 1/181*   (2006.01)
*B62D 1/185*   (2006.01)
(Continued)

(52) U.S. Cl.
CPC ............ *B62D 1/192* (2013.01); *B62D 1/181* (2013.01); *B62D 1/185* (2013.01); *B62D 1/189* (2013.01)

(58) Field of Classification Search
CPC .......... B62D 1/18; B62D 1/181; B62D 1/183; B62D 1/184; B62D 1/185; B62D 1/187;
(Continued)

(56) References Cited

U.S. PATENT DOCUMENTS

2017/0361863 A1   12/2017   Rouleau

FOREIGN PATENT DOCUMENTS

DE    102009003280 A1 * 11/2010    ............ B60N 2/067
DE    102017207561 A1 *  7/2017    ............ B62D 1/181
(Continued)

*Primary Examiner* — Keith J Frisby
(74) *Attorney, Agent, or Firm* — thyssenkrupp North America, LLC (57) ABSTRACT

An adjustment drive for a steering column for a motor vehicle comprises a threaded spindle which extends axially in the direction of a spindle axis and engages in a spindle nut, and a drive unit by which the threaded spindle and the spindle nut are driveable in rotation relative to one another, wherein the drive unit has a gear mechanism comprising a worm screw which is driveable in rotation about a worm axis standing transversely to the spindle axis, and a worm thread of the worm screw engages in the toothing of a gearwheel coaxially connected to the threaded spindle or the spindle nut, wherein a thread tooth of the worm thread engages in a tooth gap between two adjacent teeth of the toothing of the gear wheel, wherein a blocking device is provided which can be brought into a blocking position for fixing the threaded spindle relative to the spindle nut, and wherein the gearwheel and the worm screw are displaceable relative to one another in the direction of the spindle axis, and the toothing and the worm thread are configured to convert a relative axial displacement into a reduction of the gear play between gearwheel and worm screw.

12 Claims, 3 Drawing Sheets

(51) Int. Cl.
*B62D 1/189* (2006.01)
*B62D 1/19* (2006.01)

(58) Field of Classification Search
CPC .......... B62D 1/189; B62D 1/19; B62D 1/192;
B62D 1/195; B62D 1/16
USPC ............................ 280/775, 779; 74/492, 493
See application file for complete search history.

(56) References Cited

FOREIGN PATENT DOCUMENTS

DE  10 2017 201 594 A1  8/2018
DE  10 2018 212 202 A1  1/2020
WO  WO-2024083999 A1 *  4/2024  ........... F16D 41/105

* cited by examiner

ADJUSTMENT DRIVE FOR A STEERING COLUMN OF A MOTOR VEHICLE, AND STEERING COLUMN FOR A MOTOR VEHICLE

CROSS REFERENCE TO RELATED APPLICATION

This application is a U.S. Non-Provisional that claims priority to German Patent Application No. DE 10 2024 106 302.5, filed Mar. 5, 2024, the entire content of which is incorporated herein by reference.

FIELD

The present disclosure relates to an adjustment drive for a steering column for a motor vehicle.

BACKGROUND

A steering column has a carrier unit which can be attached to the vehicle body and holds an actuator unit in which a steering spindle is mounted so as to be rotatable about its longitudinal axis extending in the longitudinal direction. To set an ergonomically favourable operating position, the position of a steering wheel attached to the steering spindle can be adjusted relative to the carrier unit, in particular for longitudinal adjustment in the direction of the longitudinal axis and also or alternatively for vertical adjustment, upward and downward transversely to the longitudinal axis.

A motorised adjustment drive has for example a linear actuator drive which can be driven by an electric motor and, for longitudinal adjustment, can act on the actuator unit and a casing unit in which the actuator unit is held so as to be telescopically adjustable in the longitudinal direction.

For vertical adjustment, an adjustment drive may be interposed between the carrier unit and the actuator unit held pivotably thereby.

Generically, the adjustment drive is configured as a spindle drive in which an external thread of a threaded spindle, extending in the direction of its spindle axis, engages in a spindle nut. When driven in rotation by means of a motorised drive unit, the threaded spindle and spindle nut can be displaced relative to one another in the direction of the spindle axis. For adjustment of the steering column, the threaded spindle and the spindle nut are connected to components of the steering column which are adjustable relative to one another, for example the actuator unit and the carrier unit.

In order to guarantee a rapid and freely movable adjustment with low drive power, the spindle drive is designed with as little friction as possible. Thus a large external force acting axially on the adjustment drive in the direction of the spindle axis, for example a high force peak from a body impacting the steering wheel in the case of a crash, may lead to the threaded spindle and spindle nut being set in rotation relative to one another, resulting in a slippage of the adjustment drive. Here an uncontrolled relative movement of carrier unit and actuator unit may occur, which can have a disadvantageous effect on safety. For example, the efficacy of the energy-absorption devices, interposed between the actuator unit and the carrier unit, for controlled dissipation of kinetic energy in the case of a crash, may be impaired.

In order to prevent a spinning of the adjustment drive under high external load, it is known from DE 10 2017 201 594 B1 to provide a blocking device, which can be brought into a fixing position in the case of a crash in order to fix the adjustment drive in the set adjustment position. For this, the threaded spindle and spindle nut may be fixed relative to one another such that the spindle drive cannot yield in the adjustment direction, i.e. cannot slip, even under high force peaks in the case of a crash, but forms a rigid force-transmission element. Thus, in particular, it may be ensured that in the case of a crash, the force introduced into the actuator unit is conducted—as intended—substantially completely into energy-absorption devices arranged between the actuator unit and the carrier unit, so as to allow an optimal, controlled energy absorption.

The known blocking device is indeed effective but requires additional blocking elements interposed between the threaded spindle and the spindle nut, whereby the expense of design and production is increased.

Thus a need exists to achieve a high safety level with less expense.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention concerns an adjustment drive for a steering column for a motor vehicle, comprising a threaded spindle which extends axially in the direction of a spindle axis and engages in a spindle nut, and a drive unit by which the threaded spindle and the spindle nut are driveable in rotation relative to one another, and the drive unit has a gear mechanism comprising a worm screw which is driveable in rotation about a worm axis standing transversely to the spindle axis, and a worm thread of the worm screw engages in the toothing of a gearwheel coaxially connected to the threaded spindle or the spindle nut, wherein a thread tooth of the worm thread engages in a tooth gap between two adjacent teeth of the toothing of the gearwheel, and wherein a blocking device is provided which can be brought into a blocking position for fixing the threaded spindle relative to the spindle nut. The invention furthermore concerns a steering column with such an adjustment drive.

In an adjustment drive for a steering column for a motor vehicle, comprising a threaded spindle which extends axially in the direction of a spindle axis and engages in a spindle nut, and a drive unit by which the threaded spindle and the spindle nut are driveable in rotation relative to one another, and the drive unit has a gear mechanism comprising a worm screw which is driveable in rotation about a worm axis standing transversely to the spindle axis, and a worm thread of the worm screw engages in the toothing of a gearwheel coaxially connected to the threaded spindle or the spindle nut, wherein a thread tooth of the worm thread engages in a tooth gap between two adjacent teeth of the toothing of the gearwheel, and wherein a blocking device is provided which can be brought into a blocking position for fixing the threaded spindle relative to the spindle nut, it is provided according to the invention that the gearwheel and the worm screw are displaceable relative to one another in the direction of the spindle axis, and the toothing and the worm thread are configured to convert a relative axial displacement into a reduction of the gear play between gearwheel and worm screw.

The drive device has, as in the prior art cited initially, a gear mechanism configured as a worm gear which is arranged between an electric motor and the spindle drive. By means of the motor, the worm screw is drivable in rotation about its worm axis, and its worm thread engages in the gearwheel configured as a worm wheel. In a so-called immersion spindle drive, in which the threaded spindle is stationary with respect to rotation, the gearwheel is fixedly connected to the spindle nut which is accordingly driveable in rotation. In a rotation spindle drive, the spindle nut is attached rotationally fixedly to the steering column and the threaded spindle is connected to the gearwheel.

According to the invention, the blocking device in the gear mechanism is realised by the cooperation of the gearwheel and the worm screw. Here, the worm screw and the gearwheel are held relative to one another by the blocking device such that, under the action of a high axial force, i.e. a force exerted in the direction of the spindle axis, the worm screw can be axially displaced and loaded against the gearwheel.

Thanks to the design according to the invention, a high external force acting on the adjustment drive in the adjustment direction, for example a crash force from a body impacting the steering wheel in the case of a crash, is conducted in the axial direction into the spindle gear of the adjustment drive. This produces a relative axial displacement of gearwheel and worm screw in the direction of the spindle axis.

According to the invention, because of the relative displacement, a reduced gear play is produced and hence an increased friction at the contact faces between the worm screw, standing in gear engagement with the toothing, and the gearwheel. Accordingly, the design according to the invention may also be defined in that the toothing and the worm thread are configured to convert a relative axial load into an increase in gear friction between the gearwheel and the worm screw. The reduced gear play, or increased gear friction, from the action of an external force puts the worm gear into a self-inhibiting state. The resulting increased friction prevents the rotation of the gearwheel about the spindle axis, so that the gearwheel is turned relative to the worm screw when a high external axial force, acting in the adjustment direction, exerts a reverse torque on the spindle nut or threaded spindle.

In the invention, the spindle drive can be blocked and fixed in its momentary adjustment position purely by the axial displacement of gearwheel and worm screw. It can thereby be ensured that, even under an extremely high external load in the case of a crash, the steering column cannot be compressed in uncontrolled fashion. In this way, the perfect function of safety systems, for example energy-absorption systems, can be guaranteed.

It is an advantage of the invention that merely a corresponding configuration of gearwheel and worm screw is necessary to activate the self-inhibition, and no additional blocking elements or similar are required. Accordingly, an advantageously simple design and compact structure with low weight are possible, whereby a high functional reliability is guaranteed by the omission of additional moving parts.

In an advantageous embodiment, it is possible that a trigger threshold is formed between the gearwheel and the worm screw. The trigger threshold may be realised by a holding device which, in normal operation, holds the worm screw and the gearwheel in a defined engagement position relative to one another. As long as the axial force then acting on the adjustment drive—specifically, the adjustment force—lies below a predefined limit value, the relative position of worm screw and gearwheel remains unchanged. Only when a defined limit force is exceeded, which may occur for example from a high force peak in the case of a crash, is a relative axial displacement of gearwheel and worm screw possible. The advantage is that under the loads on the adjustment drive which are expected in normal operation, no unintentional activation of the blocking device according to the invention can take place, and a gear friction which is as low as possible can be implemented. The trigger threshold may for example be realised by a defined friction, wherein a force threshold is realised by the frictional connection. Alternatively or additionally, predetermined break-off elements, deformation elements or similar may be provided, which allow a relative movement of worm screw and gearwheel when a predefined limit force is exceeded.

An advantageous embodiment may provide that a respective tooth gap is formed tapering in wedge-like fashion at least in portions in the direction of its longitudinal extent.

A tooth gap forms the groove-shaped depression between two adjacent teeth. In its longitudinal extent—which follows the orientation of the teeth and can also be described, synonymously, as the tooth direction—this runs over the tooth width or toothing width between the two axial end faces of the toothing. The toothing may preferably be configured as a helical gear toothing, in which the teeth extend obliquely relative to the longitudinal axis. In this case, the tooth gaps also run obliquely in the tooth direction, wherein preferably all tooth gaps of the toothing taper in wedge-like fashion.

Where the present text refers to the axial extent of the tooth gaps, this means the longitudinal extent of the tooth gaps in the tooth direction.

The thread tooth of the worm thread has a defined thread tooth cross-section, which preferably remains constant over its helical course and engages by form fit in the open cross-section of the tooth gap in gear engagement. Here a defined gear play is predefined between the mutually facing contact faces of the flanks of the thread tooth and the tooth gap, which play allows a moment transmission with low friction.

Under the action of an axial crash force, the worm screw is displaced relative to the gearwheel in the axial direction, which is also designated below as the force or crash direction, transversely to its worm axis and loaded such that the portion of the worm thread in gear engagement with the toothing is moved along the tooth gap in the longitudinal direction of the teeth, i.e. in the tooth direction. In this way, the thread tooth becomes wedged between the inner faces of the tooth gap which run together in wedge-like fashion in the tooth direction. Accordingly, the gear play between the contact faces of the thread tooth and the tooth gap, which stand in gear engagement, is reduced to nil and an increased friction force between worm screw and gearwheel is generated.

The advantage of the above-mentioned design is that the advantages according to the invention can be achieved purely by a corresponding configuration of the toothing of the gearwheel.

It may be provided that the width of the tooth gap decreases at least in portions in the tooth direction. The tooth gaps, which each extend between two teeth in the tooth direction, have a width measured in the circumferential direction at a defined diameter, for example the reference diameter of the gearwheel, which width is also designated, synonymously, the gap width. The gap width accordingly designates the distance measured in the circumferential direction between the two inner faces of the tooth gap which are opposite one another in the circumferential direction, the so-called gap flanks. In contrast to the prior art, in which the gap width is constant over the toothing width in the tooth direction, for realisation of the invention this may taper in wedge-like fashion. Here it is advantageous that, with a shallow wedge angle, even at a relatively slight axial displacement and a relatively slight axial load of worm screw and gearwheel, high normal forces can be generated between the contact faces lying opposite one another with frictional connection, so that a high friction and correspondingly a safe self-inhibition can be generated. It is also advantageous that the thread tooth is clamped securely in the tooth gap without the occurrence of high outwardly directed radial forces, which could move the worm screw out of the toothed engagement.

In addition or alternatively, it is possible that the depth of the tooth gap decreases at least in portions in the tooth direction. The depth of the tooth gap is defined by the radial distance between the radially outwardly pointing tooth tips of the teeth and the base or bottom of the tooth gap, which delimits the tooth gap radially towards the inside. Under the displacement according to the invention, radial contact faces of the thread tooth and the toothing can come into frictional contact, so as to increase the self-inhibition.

To reduce the depth of the tooth gap, it may be provided that the tooth gap has a radially protruding wedge portion. The wedge portion may protrude towards the outside from the bottom of the tooth gap.

The width and the depth may be formed wedge-like individually or in combination.

The wedge-like configuration of the tooth gap may be linear, either continuously or in portions, or have a course which is bent, either continuously or in portions. By the configuration and course of the wedge shape, the friction can be adapted in defined fashion to the axial displacement or load. For example, with a shallow wedge, a relatively high clamping and frictional force can be produced at a relatively low relative load of gearwheel and worm screw.

It may be provided that the tooth gap has an axial end face. The axial end face delimits the tooth gap in the tooth direction. For this, it extends at least partially over the open gap or groove cross-section of the tooth gap. Preferably, the end face may extend over the entire open cross-section of the tooth gap. This may achieve the advantage that the worm thread contacts the end face on a relative displacement of gearwheel and worm screw in the case of a crash, and the resulting frictional connection increases the self-inhibition. Also, the flange may provide an end stop which prevents the worm screw from being moved out of the gear engagement in the tooth direction during the displacement.

It is possible that the gearwheel has a flange element axially delimiting the toothing. The flange element may for example be configured in the form of a circular disc and be attached to the toothing axially on the end face. Preferably, the flange diameter of the flange element may be adapted to the toothing diameter, measured over the radially outwardly directed tooth tips of the teeth. Because the flange diameter is greater than or equal to the toothing diameter, the end face formed on the flange element may partially, preferably completely close the open cross-section of the tooth gap on the end face side.

Preferably, it may be provided that the gearwheel has a one-piece toothing part. The toothing part may comprise the teeth, teeth gaps and in some cases the flange element. It may for example be provided by a casting or similar, to be produced in suitable fashion. The toothing is preferably inseparably connected to the spindle nut or the threaded spindle.

It is advantageous that the gearwheel comprises a plastic. Preferably, the gearwheel may be made at least partially from a thermoplastic polymer in the plastic injection-moulding process. In particular, it is advantageous that the toothing is formed from a plastic, whereby a high running smoothness and low wear can be achieved. Also, the gearwheel may preferably be injection-moulded integrally onto a metal core, for example a metal spindle nut.

In a steering column for a motor vehicle, comprising at least two components which are adjustable relative to one another and between which an adjustment drive is arranged, according to the invention it is provided that the adjustment drive is configured according to one of the preceding designs or combinations thereof. By the adjustment drive, an adjustment force can be exerted on the construction elements in an adjustment direction which is defined by the orientation of the spindle axis. The construction elements may comprise at least a carrier unit and an actuator unit which are adjustable relative to one another in the longitudinal and/or vertical direction.

The advantage of using one or more adjustment drives according to the invention is that in the case of a crash, even under an extreme external load, the steering column remains in its momentary adjustment state and no uncontrolled deformation occurs, so that an optimal action of safety systems is guaranteed, in particular of energy-absorption devices arranged between the actuator unit and the carrier unit.

Preferably, it may be provided that the steering column has a carrier unit which can be attached to a vehicle body and which holds an actuator unit in which a steering spindle is rotatably mounted, and with an adjustment drive which comprises a threaded spindle that engages via an external thread in a spindle nut, and a drive unit which is coupled to the threaded spindle or the spindle nut.

In the various figures, the same parts always carry the same reference signs and are therefore usually each only cited or mentioned once.

Figure 1:
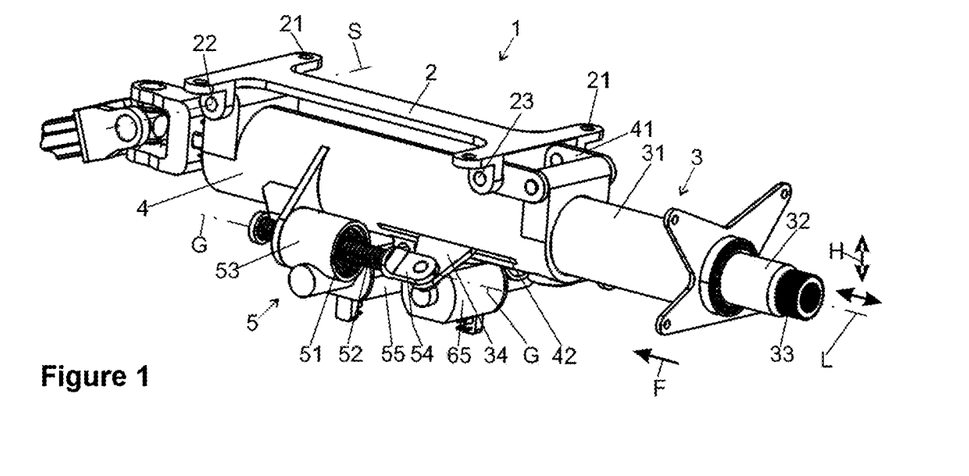
FIG. 1 shows a schematic, perspective view of a steering column according to the invention.
Figure 2:
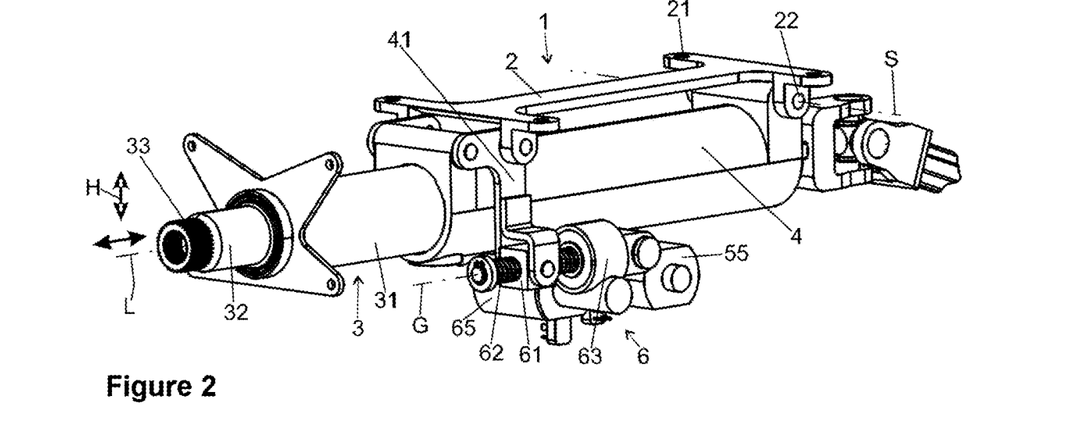
FIG. 2 shows a further perspective view of the steering column according to the invention from FIG. 1, from another observation angle.

FIG. 1 shows a steering column 1 according to the invention in a schematic, perspective view from the top left, obliquely onto the rear end relative to the direction of travel of a vehicle (not shown), where a steering wheel (not shown here) is held in the operating region. FIG. 2 shows the steering column 1 in a view from the opposite side, i.e. viewed from the top right.

The steering column 1 comprises a carrier unit 2 which has fastening means 21 in the form of fastening bores for attachment to a vehicle body (not shown). The carrier unit 2 holds an actuator unit 3 which is received in a casing unit 4, also called a guide box or box rocker.

The actuator unit 3 has a casing tube 31 in which a steering spindle 32 is mounted rotatably about a longitudinal axis L and extends axially in the longitudinal direction, i.e. in the direction of the longitudinal axis L. At the rear end of the steering spindle 32, a fastening portion 33 is formed, to which a steering wheel (not shown) can be attached.

To realise a longitudinal adjustment, the actuator unit 3 is received in the casing unit 4 so as to be telescopically displaceable in the direction of the longitudinal axis L, so that the steering wheel connected to the steering spindle 32 can be positioned forward and backward in the longitudinal direction relative to the carrier unit 2, as indicated by the double arrow parallel to the longitudinal axis L.

The casing unit 4 is mounted in a pivot bearing 22 on the carrier unit 2 so as to be pivotable about a horizontal pivot axis S lying transversely to the longitudinal axis L. In the rear region, the casing unit 4 is connected to the carrier unit 2 via an actuator lever 41. By means of a rotational movement of the actuator lever 41 by an illustrated actuator drive 6 (see FIG. 2), the casing unit 4 can be pivoted relative to the carrier unit 2 about the pivot axis S lying horizontally in the installation state, whereby a steering wheel attached to the fastening portion 33 can be adjusted in the vertical direction H, as indicated by the double arrow.

A first adjustment drive 5, for longitudinal adjustment of the actuator unit 3 relative to the casing unit 4 in the direction of the longitudinal axis L, has a spindle drive having a spindle nut 51 with an internal thread 511 which extends along an axis G—the threaded spindle axis—and in which a threaded spindle 52 engages, i.e. the external thread thereof is screwed into the corresponding internal thread 511 of the spindle nut 51. The axis G—the threaded spindle axis of the threaded spindle 52—runs substantially parallel to the longitudinal axis L.

The spindle nut 51 is mounted in a bearing housing 53, which is fixedly connected to the casing unit 4, so to be rotatable about the axis G. In the direction of the axis G, the spindle nut 51 is axially supported on the casing unit 4 via the bearing housing 53. The adjustment drive 5 is accordingly a so-called immersion spindle drive.

The axis G defines the adjustment direction of the adjustment drive 5. Where the following text mentions an axial direction in connection with the adjustment drive 5, this corresponds to the direction of the axis A.

By means of a fastening element 54 formed at its rear end, the threaded spindle 52 is connected to the actuator unit 3 via a transmission element 34, specifically so as to be fixed in the direction of the axis G or longitudinal axis L and stationary with respect to rotation about the axis G. The rotatably driveable spindle nut 51 and the rotationally stationary threaded spindle 52 constitute a so-called immersion spindle drive.

The transmission element 34 extends from the actuator unit 3 through a slot-like passage opening 42 in the casing unit 4. To adjust the steering column 1 in the longitudinal direction, the transmission element 34 can be moved freely in the passage opening 42 along the longitudinal direction.

The adjustment drive 5 has an electric motor 55, by means of which the spindle nut 51 is drivable in rotation with respect to the axis G, relative to the stationary threaded spindle 52. Thus—depending on the rotation direction of the drive motor 55—the threaded spindle 52 can be displaced translationally in the direction of axis G relative to the spindle nut 51, so that accordingly, the actuator unit 3 connected to the threaded spindle 52 is adjusted in the direction of the longitudinal axis L relative to the casing unit 4, which is connected to the spindle nut 51.

FIG. 2, which depicts a perspective view of the steering column 1 from the side lying at the rear in FIG. 1, shows how a second adjustment drive 6 is attached to the steering column 1 for adjustment in the vertical direction H. This adjustment drive 6 comprises a spindle nut 61, in the internal thread 511 of which a threaded spindle 62 engages along axis G. The threaded spindle 62 is mounted in a bearing housing 63, which is fastened to the casing unit 4, so as to be rotatable about the axis G and supported axially, in the direction of the axis G, on the casing unit 4, and is drivable in rotation by an electric drive motor 65 optionally in both rotational directions about the axis G. Accordingly, the adjustment drive 6 is a so-called rotation spindle drive.

The spindle nut 61, which may be formed from plastic or from a non-ferrous metal such as brass or similar, is attached stationarily with respect to a rotation about the axis G at one end of the dual-armed actuator lever 41, which is mounted on the carrier unit 2 so as to be rotatable about a pivot bearing 23, and the other arm of which is connected by the other end to the casing unit 4.

By rotating the threaded spindle 62—depending on the rotation direction of the drive motor 65—the spindle nut 61 can be displaced translationally in the direction of the axis G relative to the threaded spindle 62, so that accordingly, the casing unit 4—which is connected via the actuator lever 41 to the spindle nut 61—and the actuator device 3 received therein can be adjusted up or down in the vertical direction H relative to the carrier unit 2, as indicated by the double arrow.

Figure 3:
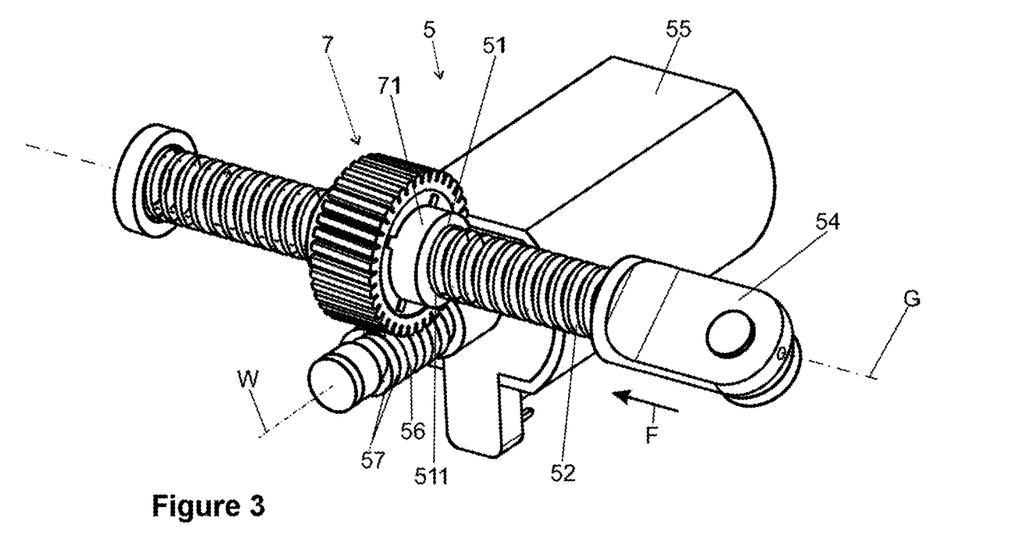
FIG. 3 shows an adjustment drive according to the invention of a steering column from FIGS. 1 and 2, in a cutaway schematic view.
Figure 5:
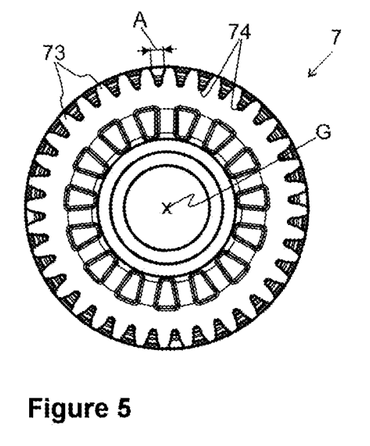
FIG. 5 shows a gearwheel according to the invention in a second design, in axial view.

FIG. 3 shows the actuator drive 5, formed as an immersion spindle drive, in a separate cutaway illustration, wherein the bearing housing 53 has been omitted for greater clarity. FIG. 5 shows a longitudinal section along the spindle axis G, and FIG. 6 an enlarged detail view therefrom.

The adjustment drive 5 has a gearwheel 7 or toothed wheel 7 comprising a hub element 71 (=hub), which has the spindle nut 51 with the internal thread 511 and is here arranged coaxially to the spindle axis G. The spindle nut 51 and the hub element 71 may preferably be formed in one piece, as shown. It is however also conceivable and possible that the spindle nut 51 is formed from a metallic material, and the hub element 71—which may be formed from a plastic—is moulded thereon in the plastic injection-moulding process.

Figure 4:
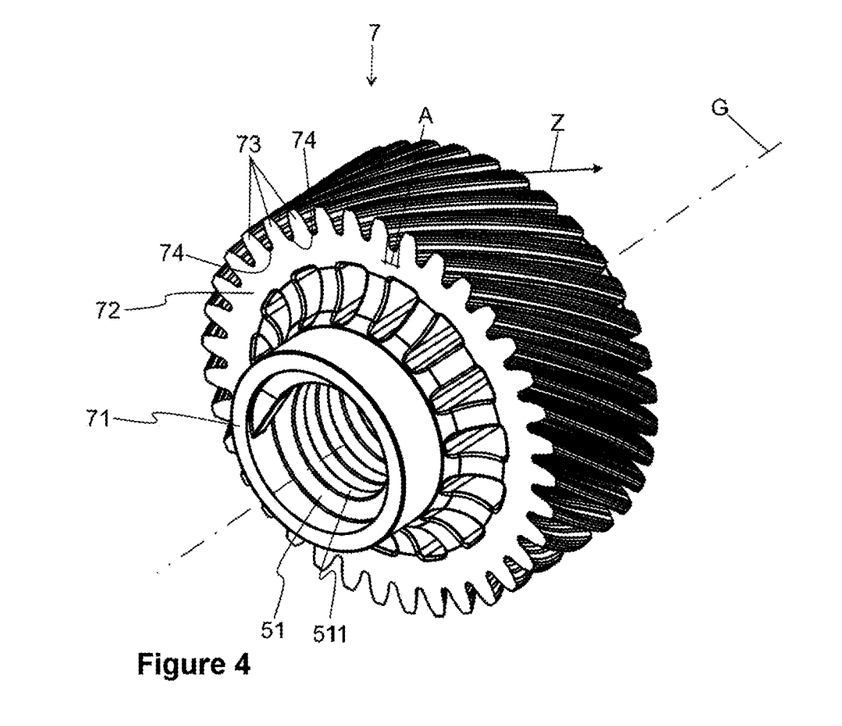
FIG. 4 shows a gearwheel according to the invention of the adjustment drive from FIG. 3, in a perspective view.

FIG. 4 shows a cutaway, perspective view of the gearwheel 7 in a first design. It has a toothing 72 running around on the outside coaxially to the hub element 71. This is configured as a helical gear toothing with a plurality of teeth 73 protruding radially towards the outside, between which, in the circumferential direction, tooth gaps 74 are arranged. The teeth 73 and accordingly the tooth gaps 74 extend in a tooth direction Z, obliquely to axis G.

A worm screw 56 is connected to the motor shaft of the motor 55 and is driveable in rotation about its worm axis W. The worm axis W stands transversely, preferably perpendicularly to the axis G.

The worm screw 56 has a worm tooth 57 which runs helically around it and engages in the tooth gaps 74 of the toothing 72 in toothed engagement.

Each tooth gap 74 has a gap width A measured substantially in the circumferential direction, specifically perpendicularly to the tooth direction Z. The gap width A corresponds to the distance between the flanks of the teeth 73, which stand in toothed engagement with the worm tooth 57 of the worm gear 56.

According to the invention, the gap width A decreases in the tooth direction Z, so that viewed in the tooth direction Z, the tooth gap 74 tapers in wedge-like fashion. Thus in FIG. 4, the gap width A on the end side facing the viewer is larger than on the end side facing away from the viewer.

If a body impacts the steering wheel in the case of a crash, a high crash force Facts on the adjustment drive 5 via the steering spindle 32 and the casing tube 31. As can be seen from FIG. 3, the crash force F is transmitted in the axial direction of the axis G via the threaded spindle 52 to the gearwheel 7. The latter is displaced axially in the direction of the crash force F relative to the worm screw 56, transversely to the worm axis W, wherein the worm tooth 57 is moved along the tooth gap 54 in the tooth direction Z. Because the gap width A tapers in this tooth direction Z until it is smaller than the width of the worm tooth 57, on displacement of the gearwheel 7 relative to the worm screw 56, the worm tooth 57 becomes wedged in the tooth gap 74 between the tooth flanks of the teeth 73 and fixed by frictional connection. Thus the gear friction is increased and the worm gear brought into a self-inhibiting state.

Figure 6:
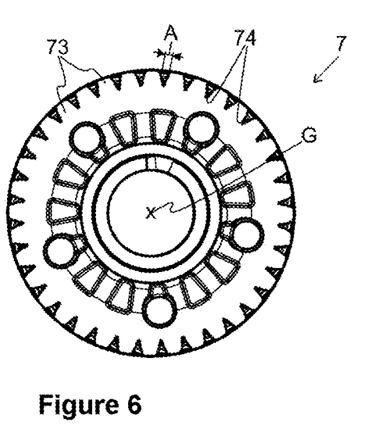
FIG. 6 shows the gearwheel from FIG. 5 in an opposite axial view.
Figure 7:
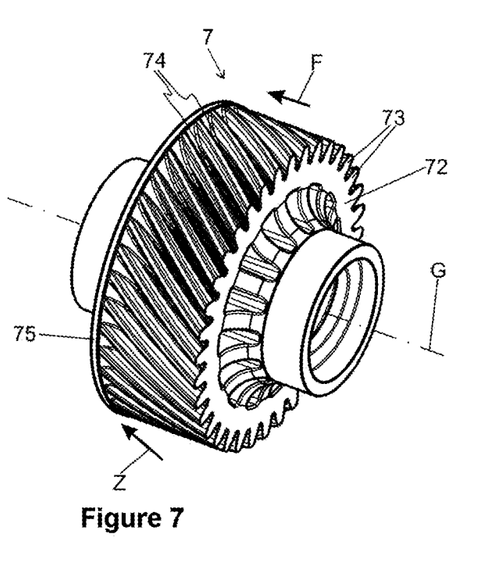
FIG. 7 shows the gearwheel from FIGS. 5 and 6 in a perspective view.
Figure 8:
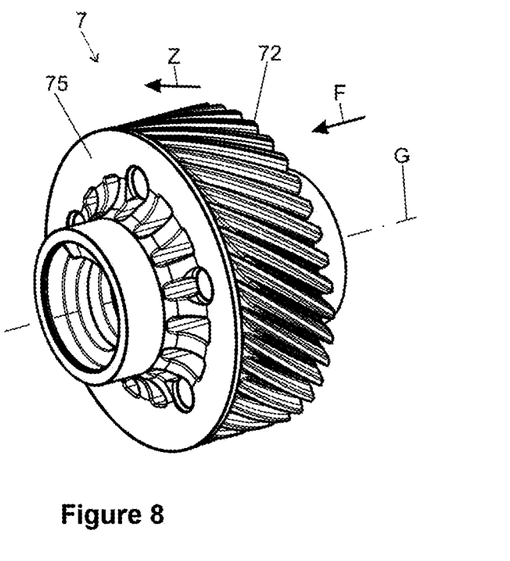
FIG. 8 shows the gearwheel from FIGS. 5 and 6 in a further perspective view.

FIGS. 5 to 8 show various views of a gearwheel 7 according to the invention in a second design, specifically in FIG. 5 in an axial end view in the direction of the crash force F, and in FIG. 6 in the opposite direction. FIGS. 7 and 8 show perspective views.

It is clearly evident that the gap width A is larger in the view of FIG. 5 than in FIG. 6, i.e. according to the invention, it tapers in wedge-like fashion in the tooth direction Z.

In the second embodiment, the gearwheel 7 has a flange 75 which is moulded axially onto the toothing in the region of the reduced gap width A. The diameter of the flange 75, as in the example shown, may correspond approximately to the diameter of the gearwheel 7, measured over the tips of the teeth 73. The tooth gaps 74 are thereby axially closed in the tooth direction Z.

During the above-described displacement, the worm screw 56 with the worm tooth 57 may hit against the flange 75, whereby the friction is increased. Also, the flange 75 functions as an end stop, which prevents the worm screw 56 from being moved out of the gear engagement during the displacement.

LIST OF REFERENCE SIGNS

1 Steering column
2 Carrier unit
21 Fastening means
22, 23 Pivot bearing
3 Actuator unit
31 Casing tube
32 Steering spindle
33 Fastening portion
34 Transmission element
4 Casing unit
41 Actuator lever
42 Passage opening
5,6 Adjustment drive
51, 61 Spindle nut
511 Internal thread
52, 62 Threaded spindle
53, 63 Bearing housing
54 Fastening element
55, 65 Motor
56, 66 Worm screw
57 Worm tooth
7 Gearwheel
71 Hub element
72 Toothing
73 Tooth
74 Tooth gap
75 Flange
L Longitudinal axis
H Vertical direction
G Spindle axis (threaded spindle axis)
W Worm axis
Z Tooth direction
A Gap width

The invention claimed is:

1. An adjustment drive for a steering column for a motor vehicle, comprising:
   a threaded spindle which extends axially in a direction of a spindle axis and engages in a spindle nut; and
   a drive unit by which the threaded spindle and the spindle nut are driveable in rotation relative to one another;
   wherein the drive unit has a gear mechanism comprising a worm screw which is driveable in rotation about a worm axis standing transversely to the spindle axis, and a worm thread of the worm screw engages in toothing of a gearwheel coaxially connected to the threaded spindle or the spindle nut;
   wherein a thread tooth of the worm thread engages in a tooth gap between two adjacent teeth of the toothing of the gearwheel;
   wherein a blocking device is provided which can be brought into a blocking position for fixing the threaded spindle relative to the spindle nut;
   wherein the gearwheel and the worm screw are displaceable relative to one another in the direction of the spindle axis, and the toothing and the worm thread are configured to convert a relative axial displacement into a reduction of the gear play between gearwheel and worm screw.

2. The adjustment drive according to claim 1, wherein a trigger threshold is formed between the gearwheel and the worm screw.

3. The adjustment drive according to claim 1, wherein a respective tooth gap is formed tapering in wedge-like fashion at least in portions in a tooth direction.

4. The adjustment drive according to claim 3, wherein a width of the tooth gap decreases at least in portions in the tooth direction.

5. The adjustment drive according to claim 3, wherein a depth of the tooth gap decreases at least in portions in the tooth direction.

6. The adjustment drive according to claim 5, wherein the tooth gap has a radially protruding wedge portion.

7. The adjustment drive according to claim 1, wherein the tooth gap has an axial end face.

8. The adjustment drive according to claim 1, wherein the gearwheel has a flange element axially delimiting the toothing.

9. The adjustment drive according to claim 1, wherein the gearwheel has a one-piece toothing part.

10. The adjustment drive according to claim 1, wherein the gearwheel comprises a plastic.

11. A steering column for a motor vehicle, comprising at least two components which are adjustable relative to one another and between which an adjustment drive is arranged, wherein the adjustment drive is configured according to claim 1.

12. The steering column according to claim 11, further comprising:
- a carrier unit which can be attached to a vehicle body and which holds an actuator unit in which a steering spindle is rotatably mounted;
- wherein the adjustment drive is connected to the carrier unit or the actuator unit.

\* \* \* \* \*